No. 635,685. W. W. HOLLOWAY. Patented Oct. 24, 1899.
COTTON CULTIVATOR WHEEL.
(Application filed Mar. 7, 1899.)
(No Model.)
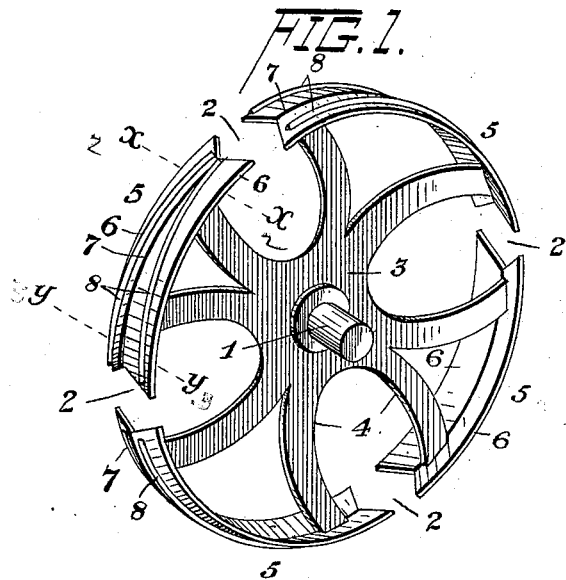
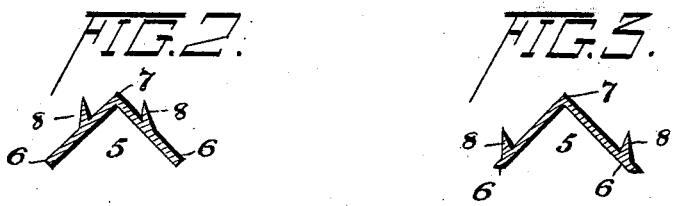 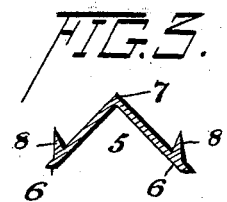
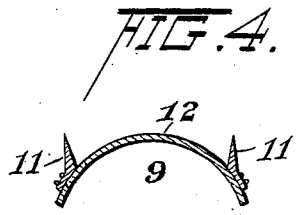
Witnesses
Sam'l R. Turner
L. C. Dyer
Inventor
Willis W. Holloway
By C. J. Bell
Attorney

UNITED STATES PATENT OFFICE.

WILLIS W. HOLLOWAY, OF ROYSE CITY, TEXAS.

COTTON-CULTIVATOR WHEEL.

SPECIFICATION forming part of Letters Patent No. 635,685, dated October 24, 1899.

Application filed March 7, 1899. Serial No. 708,105. (No model.)

*To all whom it may concern:*

Be it known that I, WILLIS W. HOLLOWAY, a citizen of the United States, residing at Royse City, in the county of Rockwall and State of Texas, have invented certain new and useful Improvements in Cotton-Cultivator Wheels, of which the following is a specification.

This invention relates to cotton-cultivators, and particularly to a cotton cutter or chopper, which consists of a wheel having a sectional rim or periphery of novel and peculiar construction.

The object of the invention is to provide a cotton cultivator or chopping wheel, the periphery of which will mash down or depress the cotton and then cut it, leaving the standing cotton untouched or unharmed.

A further object of the invention is to provide a cotton-cultivator wheel the peripheral sections of which have peculiarly-arranged cutting blades or knives.

In the accompanying drawings, forming parts of this application, Figure 1 is a perspective view of the wheel. Fig. 2 is an enlarged section on the line X X in Fig. 1. Fig. 3 is a similar view on the line Y Y in Fig. 1. Fig. 4 is a similar section of a modification.

The same letter and numeral references denote the same parts throughout the several figures of the drawings.

The wheel has the usual hub 1 for the purpose of attaching it to any suitable farming machine, plow, or other cultivator, or the wheel may have a suitable stock, handles, and necessary mechanism to operate it independently.

The periphery of the wheel is made into a series of sections, with a diamond-shaped opening or space B between them, and the sections are connected to the hub 1 by spokes 3, having diverging arms 4. The sections comprise a peripheral rim 5, the edges 6 of which fall considerably below the middle or arched center 7 of the rim at each side thereof, having said arched or central portion protruding or projecting beyond the cutters 8, which are formed or secured on each side of said arch. The cutting knives or blades 8 extend over the rims 5 and converge from one end of a section to the other end of the same section, or they converge from one diamond-shaped opening 2 to the other, so that the greatest space or interval between the knives of one section is upon one side of the diamond-shaped openings and the smallest space or interval between the knives is upon the opposite side of the said openings. This arrangement of knives affords a gradual contracted space between the knives of each section from the front to the rear end of each section, so that all sizes and grades of the cotton depressed by the protruding portion 7 will certainly be cut by the time it reaches the rear end of the knives. The openings allow the standing cotton to be unharmed.

Referring to the modification shown in Fig. 4, the rim 9 is made with its protrusion 10 at an angle and the rim is V-shaped in cross-section. This gives a sharper and greater projection between and beyond the cutting edges of the blades or knives 11, so that a greater depression of the small cotton is attained.

I do not wish to be understood as limiting myself to any special number of rim-sections, to the manner of producing the protrusion between the knives to the extent of convergency of the knives or means of attaching or forming them on the sections, nor to the size of the wheel or the application of it to any particular machine, as I reserve to myself the right to make such changes, alterations, and modifications therein as may be found most desirable.

Having thus described my invention, what I claim as new, and desire to secure by Letters Patent, is—

1. A cotton-cultivator wheel comprising peripheral arched sections, and a pair of knives extending throughout each section, as set forth.

2. The combination with a sectional cultivator-wheel, of the knives converging from one end to the other of each section, as set forth.

3. The combination with a sectional cultivator-wheel, having an arched periphery, of the knives converging from one end to the other of each section, said arch projecting beyond the cutting edges of the knives, as set forth.

4. In a cotton-cultivator wheel, the combination of the knives, and the wheel-sections carrying the knives and projecting between and beyond the cutting edges of the knives as set forth.

5. In a cotton-cultivator wheel, the combination of the arched sections separated by a diamond-shaped opening, of knives secured to the sections and converging from one opening to the other, as set forth.

In witness whereof I hereunto set my hand in the presence of two witnesses.

WILLIS W. HOLLOWAY.

Witnesses:
E. L. STEVENSON,
JAMES LISK.